United States Patent Office 3,489,897
Patented Jan. 13, 1970

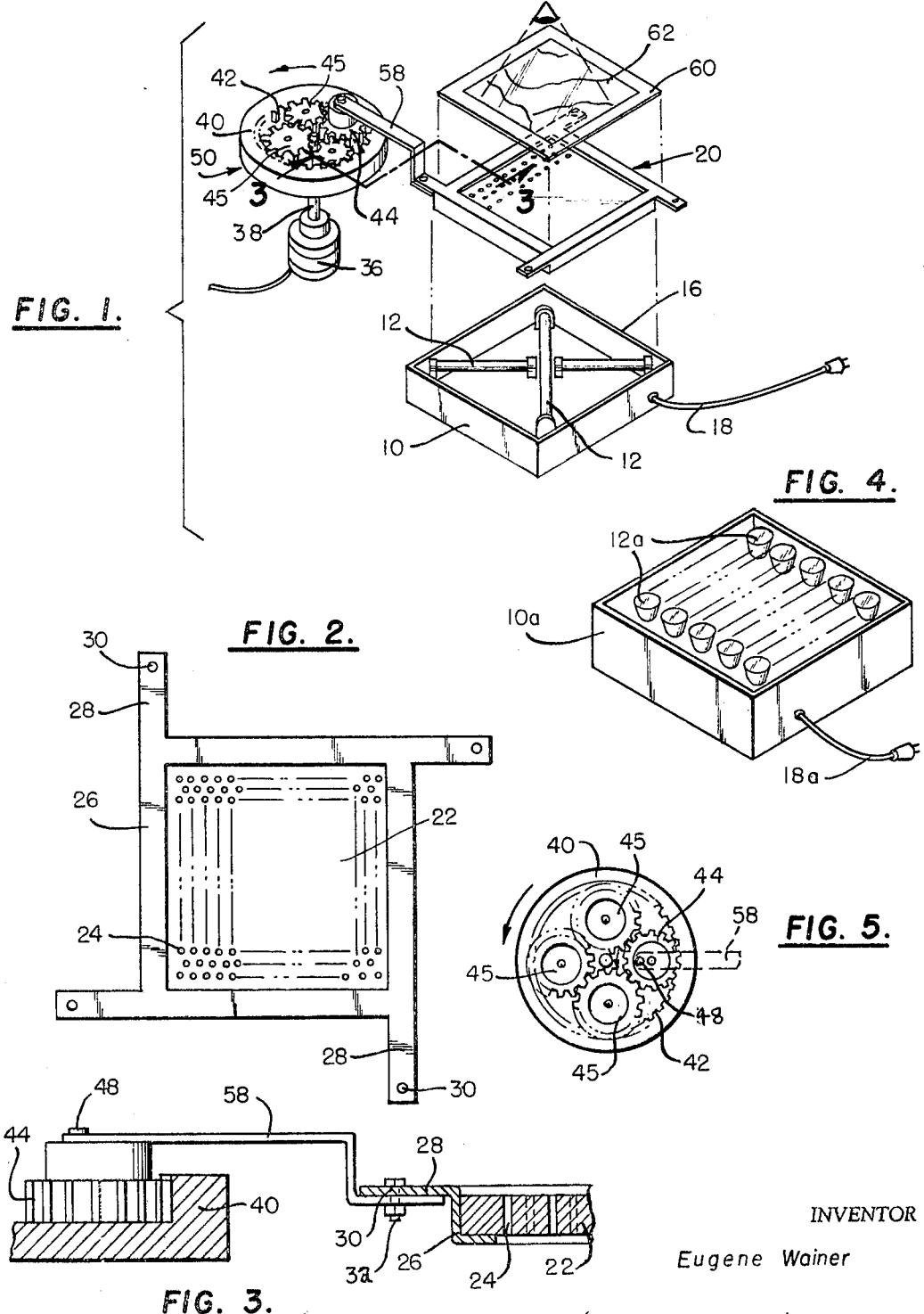

3,489,897
COLLIMATED LIGHT DEVICE WITH MEANS TO IMPART A DOUBLE CIRCULATORY MOTION TO A MICROCHANNEL PLATE
Eugene Wainer, Shaker Heights, Ohio, assignor to Horizons Incorporated, a Division of Horizons Research Incorporated, a corporation of Ohio
Filed Aug. 17, 1967, Ser. No. 661,321
Int. Cl. G01n 21/00
U.S. Cl. 250—62                                         6 Claims

ABSTRACT OF THE DISCLOSURE

Simple and inexpensive means for collimating electromagnetic radiation including light, X-rays, electron beams, infrared radiation, sound emissions and the like, utilizing an apertured channel plate made of ceramic or metal and exhibiting a length:diameter ratio of at least 50 to 1, and provided with relatively coarse equidistant holes, said plate being caused to be moved in a specific manner while interposed between a non-collimated source and a film to be viewed or exposed.

---

This invention relates to the collimation and improvement of resolution of light beams, X-rays, electron beams, infrared radiation, sound emissions and the like emanating from non-collimated sources.

In one preferred embodiment, it relates to a relatively simple and inexpensive device for producing a collimated light particularly suited to use in the examination of relatively large photographic subjects, such as the 9-inch by 9-inch transparencies presently evaluated by photo interpreters.

In another preferred embodiment, it relates to the collimation of X-rays so that collimated X-rays are available for the exposure of an X-ray sensitive film.

In examination of high resolution transparencies by an experienced photo interpreter an apparent loss in both resolution and acuity is regularly experienced when widely separated portions are compared. For example, if an area in the center of the photograph is compared with an area close to the edge of the photograph, a substantial loss in resolution appears to exist at the edge of the photograph even if optical means are employed to aid in the comparison. Accurate measurements using resolution targets placed in the center and edge portions of the photograph have established that no actual loss in resolution has occurred and it appears that the apparent loss in resolution and acuity may be due principally to the fact that the light by which the subject is viewed is not collimated.

Intricate and expensive means for collimating light are already known and one object of the present invention is to provide a suitable, simple, inexpensive and efficient device for the above.

A schematic representation of one preferred apparatus of the present invention is shown in the drawings accompanying this specification in which FIGURE 1 is an exploded view of the collimating device seen in perspective;

FIGURE 2 is an enlarged plan view of one element of the apparatus of FIGURE 1, namely, the channel plate;

FIGURE 3 is a view in section taken on plane 3—3 of FIGURE 1;

FIGURE 4 is a view of another embodiment of a light source which could be used in the device of FIGURE 1; and FIGURE 5 is a plan view of the drive mechanism utilized in FIGURE 1.

As seen in FIGURE 1, the device includes a light source 10, a channel plate 20 positioned between the light source 10 and a viewing table 60, preferably of opalescent glass, on which a photographic transparency 62 is placed. A suitably actuated drive means 50 is mechanically linked to channel plate 20 to provide a desired motion to the plate in order that the non-collimated light emanating from light source 10 may be collimated and the apparent loss of resolution and acuity experienced by the photo interpreter viewing the transparency 62 may be substantially diminished if not entirely eliminated.

Light source 10 is shown in FIGURE 1 as a pair of ordinary fluorescent light tubes 12 crossed at right angles and supported in a frame 16 provided with the usual sockets for the lighting tubes and with a cord 18 connecting them to a source of electricity. Instead of this arrangement a bank of point sources of light may be utilized, the point sources being pulsed xenon arcs, mercury or zirconium arcs, or tungsten-iodine or ordinary tungsten lamps, the spacing of the lamps and their distance from the viewing plane being chosen according to the intensity of the light source and its characteristics. For example, twenty lamps positioned approximately one foot from the viewing plane would provide an even illumination over a 9-inch by 9-inch square field, i.e. there being one lamp for about each four square inches. Point sources as described could be expected to produce a significant improvement over the crossed fluorescent lamp tubes shown in FIGURE 1. FIGURE 4 shows one such lamp arrangement in which the light source 10a is provided with lamps 12a and an extension cord 18a.

The channel plate 20 shown in FIGURE 2 consists of a thin metal or ceramic wafer 22 provided with a multitude of passages 24 through the thickness of the wafer. The channel plate 20 may be square, rectangular, or other straight sided geometric shape, or it may be circular, elliptical, oval or other curved geometric shape, but for ease of manufacture and for reason of economy, a square channel plate is preferred, particularly when the photographic transparencies being viewed are square. The length (or width) to thickness ratio of plate 20 should be at least 50 to 1 and is preferably at least as high as 200 to 1. Channel plate 20 is provided with a large number of relatively coarse holes extending through the plate and at right angles to the major surfaces of the plate, the holes being substantially parallel to one another and being equidistant from one another. The holes 24 may be as large as 50 mils in diameter and need not be finer than about 10 mils in diameter.

Channel plate 20 is placed in a rigid metal frame 26 in the form of a square, one or more sides of which includes an extension 28 provided with a hole 30 adapted to receive a dowel pin 32 or other means connecting frame 26 with a means to cause the plate to describe a desired motion.

Plate 22 can be produced by punching and the open to closed ratio need not be greater than about 30% of the plate surface area if a plate 22 is of ceramic or may be higher than 50% if plate 22 is made of metal. The holes 24 need not be circular, since plate 22 can be metal honeycomb with diamond, triangular or other shaped holes. Plates 22 can be made of metal foil as thin as 3 mils and in any event should be positioned as close to the lower surface of glass 60, as possible, a distance of 1 to 2 mils having been found satisfactory.

The microchannel plate 20 is supplied with a complex movement in a plane parallel to the plane of viewing by the means designated 50 in FIGURE 1. The movement imparted to plate 20 is the sum of two circular motions, the nature of which will be apparent from the mechanism which generates the motion.

A motor 36 connected by means of a shaft 38 to a toothed plate 40 having gear teeth 42 causes plate 40 to rotate about shaft 38 which passes through the central axis of the plate and is keyed to the plate.

A spur gear 44 is attached to gear plate 40 by means of a pin 41 on which it rotates. Pin 41 is keyed to plate 40. Gear plate 40 and the spur gear 44 positioned therein constitute a planetary gear mechanism which is connected to plate 22 by means of a link 58 connecting frame 26 and plate 22 with motion producing unit 50 by means of dowel pin 48 which fits in a hole 46 eccentrically located with reference to axis of the spur gear 44 (FIGURE 5). Three additional gears 45 supported on pins extending upwardly from gear plate 40 mesh with one another and with gear 44 and with teeth 42 so that gears 44 and 45 move in plate 42 as a unit.

The motion which the gear train imparts to the plate 22 involves describing a circle which is at least twice the distance (and may be any factor greater than twice) between two adjacent channels 24 plus always a distance of half the distance between two adjacent channels 24. In addition, this circle of movement is then imposed on another circle of movement in which the circle itself is at the same time rotating around a much larger diameter circle equivalent to slightly more than twice the diameter of the first described circle. The first described circle has a speed of rotation so that the circle is formed at least 32 times a second. The technical description for such a rotation may be defined as a gear rotating around a changing center of rotation. The channel plate is actuated either at one corner, e.g. as shown in FIGURES 1 and 3, or at all four corners for greater mechanical stability and is attached to the gear system through a dowel and slot arrangement in which the dowel pin 48 is fixed close to the circumference of the inner gear and it is the diameter prescribed by this dowel pin which must be equivalent to a factor of at least 2 greater than the distance between two adjacent channels plus half the distance between two adjacent channels.

When the device is used to collimate X-rays from a non-collimated source, instead of light source 10, an X-ray source is utilized, and instead of a photographic transparency 62 on viewing table, an X-ray sensitive film is positioned on table 60.

Both the microchannel plate and the means to provide it with the above described double circulatory movement are relatively inexpensive to fabricate and are relatively rugged in construction.

The essential condition necessary for collimation is obtained by the double circulatory movement of the microchannel plate in a plane parallel to the plane of the plate. The first circulatory movement is due to the movement imparted to plate 22 by rotation of gear 44 which causes a point on plate 22 to describe a circle which is at least 2½ times the distance between two adjacent channels and which is formed at least 32 times a second and this circulatory movement is imposed on another circle of movement due to rotation of gear plate 40 and consequent rotation of gear 44, in which the first circle of movement is at the same time rotating about a much larger diameter circle equivalent to slightly more than twice the diameter of the first described circle.

I claim:
1. Means for collimating light, X-rays, electron beams, infrared radiation and sound emissions, including in combination:
   a broad flat microchannel plate perforated with a plurality of holes extending through the thinnest dimension of said plate, said holes being parallel to each other and being equally distant from one another, the ratio of the length of said plate to the thickness of said plate being at least 50 to 1;
   means to impart a double circulatory motion to said plate in a plane parallel to the plane of said plate, whereby each point on said plate is caused to describe a first circle in the plane of said plate, the first circulatory movement imparted to said plate causing said plate to describe a circle which is at least 2½ times the distance between adjacent holes in said plate and which is formed at least 32 times per second, and second circulatory motion imposed on said first circulatory motion, said second circulatory motion describing a rotation around a much larger diameter circle having a diameter slightly more than twice the diameter of the first described circle;
   said microchannel plate being disposed between a source of non-collimated electromagnetic radiation and a plane on which it is desired that collimated radiation be received.

2. The apparatus of claim 1 in which the radiation being collimated is light and the plane on which the collimated radiation is received is a photographic transparency.

3. The apparatus of claim 1 in which the radiation being collimated is X-rays and the plane on which the collimated X-radiation is received is an X-ray sensitive film.

4. The apparatus of claim 1 wherein the means to impart a double circulatory motion is a planetary gear.

5. The apparatus of claim 1 wherein said microchannel plate is a metal foil.

6. The apparatus of claim 1 including a mechanical link connecting said microchannel plate to said means to impart the desired motion to said plate.

References Cited

FOREIGN PATENTS 759,534   2/1934   France.

RALPH G. NILSON, Primary Examiner

A. L. BIRCH, Assistant Examiner

U.S. Cl. X.R.

40—106.1; 250—63, 105